(12) United States Patent
Chen et al.

(10) Patent No.: US 10,152,450 B2
(45) Date of Patent: Dec. 11, 2018

(54) REMOTE PROCESSING AND MEMORY UTILIZATION

(75) Inventors: Dong Chen, Croton on Hudson, NY (US); Noel A. Eisley, Wappingers Falls, NY (US); Philip Heidelberger, Cortlandt Manor, NY (US); James A. Kahle, Austin, TX (US); Fabrizio Petrini, Millwood, NY (US); Robert M. Senger, Tarrytown, NY (US); Burkhard Steinmacher-Burow, Esslingen (DE); Yutaka Sugawara, White Plains, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/584,323

(22) Filed: Aug. 13, 2012

(65) Prior Publication Data

US 2013/0290473 A1 Oct. 31, 2013

Related U.S. Application Data

(63) Continuation of application No. 13/570,916, filed on Aug. 9, 2012, now Pat. No. 9,037,669.

(51) Int. Cl.
| | |
|---|---|
| *G06F 15/167* | (2006.01) |
| *G06F 15/173* | (2006.01) |
| *G06F 9/54* | (2006.01) |
| *H04L 29/06* | (2006.01) |
| *H04L 29/08* | (2006.01) |

(52) U.S. Cl.
CPC ........ *G06F 15/17331* (2013.01); *G06F 9/544* (2013.01); *H04L 29/0617* (2013.01); *H04L 67/1097* (2013.01)

(58) Field of Classification Search
CPC .............. G06F 15/17331; G06F 9/544; H04L 29/0617; H04L 67/1097
USPC ......................................................... 709/213
See application file for complete search history.

(56) References Cited

U.S. PATENT DOCUMENTS

| | | | | |
|---|---|---|---|---|
| 5,430,850 A | * | 7/1995 | Papadopoulos et al. ...... | 719/314 |
| 5,491,800 A | * | 2/1996 | Goldsmith et al. ........... | 709/221 |
| 5,790,804 A | | 8/1998 | Osborne | |

(Continued)

OTHER PUBLICATIONS

U.S. Appl. No. 13/570,916 Corrected Notice of Allowability dated Apr. 21, 2015, 4 pages.

(Continued)

*Primary Examiner* — Krisna Lim
(74) *Attorney, Agent, or Firm* — Cantor Colburn LLP (57) ABSTRACT

According to one embodiment of the present invention, a system for operating memory includes a first node coupled to a second node by a network, the system configured to perform a method including receiving the remote transaction message from the second node in a processing element in the first node via the network, wherein the remote transaction message bypasses a main processor in the first node as it is transmitted to the processing element. In addition, the method includes accessing, by the processing element, data from a location in a memory in the first node based on the remote transaction message, and performing, by the processing element, computations based on the data and the remote transaction message.

18 Claims, 3 Drawing Sheets

(56) References Cited

U.S. PATENT DOCUMENTS

| | | | |
|---|---|---|---|
| 6,047,323 A | 4/2000 | Krause | |
| 6,170,003 B1 | 1/2001 | Benkual et al. | |
| 6,553,422 B1* | 4/2003 | Nelson | G06F 21/305 |
| | | | 709/217 |
| 6,662,220 B1 | 12/2003 | Meyer | |
| 6,744,765 B1* | 6/2004 | Dearth | H04L 47/10 |
| | | | 370/349 |
| 7,177,912 B1 | 2/2007 | Ignatoff et al. | |
| 7,238,218 B2 | 7/2007 | Hepner et al. | |
| 7,389,403 B1 | 6/2008 | Alpert et al. | |
| 7,620,954 B2* | 11/2009 | Mattina et al. | 719/311 |
| 7,822,008 B2 | 10/2010 | Frei et al. | |
| 7,889,657 B2* | 2/2011 | Blocksome | 370/235 |
| 7,899,680 B2 | 3/2011 | Insley et al. | |
| 7,948,999 B2* | 5/2011 | Blocksome et al. | 370/406 |
| 8,249,553 B2 | 8/2012 | Bosch et al. | |
| 8,457,094 B2 | 6/2013 | Frei et al. | |
| 8,626,123 B2 | 1/2014 | Bosch et al. | |
| 2002/0062402 A1* | 5/2002 | Regnier | G06F 9/546 |
| | | | 719/313 |
| 2003/0041225 A1* | 2/2003 | Mattina et al. | 712/30 |
| 2004/0019891 A1 | 1/2004 | Koenen | |
| 2006/0143350 A1* | 6/2006 | Miloushev | G06F 9/5016 |
| | | | 710/242 |
| 2007/0055825 A1* | 3/2007 | Blumrich et al. | 711/141 |
| 2007/0073992 A1* | 3/2007 | Allen et al. | 711/170 |
| 2007/0073993 A1* | 3/2007 | Allen et al. | 711/170 |
| 2007/0169042 A1* | 7/2007 | Janczewski | 717/149 |
| 2007/0234294 A1* | 10/2007 | Gooding | G06F 11/3664 |
| | | | 717/124 |
| 2008/0082779 A1* | 4/2008 | Ogasawara | G06F 1/3203 |
| | | | 711/170 |
| 2008/0183812 A1 | 7/2008 | Paul et al. | |
| 2008/0240105 A1* | 10/2008 | Abdallah | H04L 12/66 |
| | | | 370/392 |
| 2008/0273534 A1* | 11/2008 | Blocksome | 370/392 |
| 2008/0273543 A1* | 11/2008 | Blocksome et al. | 370/406 |
| 2009/0011738 A1 | 1/2009 | Sasakura | |
| 2009/0227234 A1 | 9/2009 | Bosch et al. | |
| 2010/0064070 A1* | 3/2010 | Yoshimura et al. | 710/22 |
| 2010/0293493 A1 | 11/2010 | Khazanov et al. | |
| 2011/0093854 A1 | 4/2011 | Blanc et al. | |
| 2012/0069131 A1 | 3/2012 | Abelow | |
| 2012/0225640 A1 | 9/2012 | Bosch et al. | |
| 2013/0012164 A1 | 1/2013 | Bosch et al. | |
| 2013/0205120 A1* | 8/2013 | Guthrie et al. | 712/220 |
| 2013/0205121 A1* | 8/2013 | Guthrie et al. | 712/220 |
| 2013/0326191 A1* | 12/2013 | Bogdanov | G06F 9/547 |
| | | | 712/30 |
| 2014/0047060 A1* | 2/2014 | Chen | G06F 9/547 |
| | | | 709/213 |

OTHER PUBLICATIONS

U.S. Appl. No. 13/570,916, Notice of Allowance dated Nov. 21, 2014, 14 pages.

* cited by examiner

REMOTE PROCESSING AND MEMORY UTILIZATION

CROSS REFERENCE TO RELATED APPLICATION

This application is a continuation of U.S. application Ser. No. 13/570,916 entitled "REMOTE PROCESSING AND MEMORY UTILIZATION" filed on Aug. 9, 2012, the disclosure of which is incorporated by reference herein in its entirety.

BACKGROUND

The present invention relates generally to computer memory, and more particularly to an active buffered memory system configured to perform remote processing.

Computer systems often require a considerable amount of high speed memory, such as random access memory (RAM), to hold information, such as data and programs, when a computer is powered and operational. Memory device densities have continued to grow as computer systems have increased performance and complexity.

Communication from a main processor to locations on dense memory devices can require additional power due to longer signal paths resulting from the increased density. In addition, increased power consumption within high density memory devices can lead to temperature management issues. Further, data access times and latency associated with data operations are increased while effective bandwidth between the main processor and memory are reduced due to the distance between the processor and memory. The longer signal paths may also allow for more chances for corruption or data errors during data transmission between the main processor and memory. Accordingly, the increased density of memory devices may result in undesirable power consumption and reduced performance due to the distance between the system components. In addition, networks may be utilized to connect processors and memory, thus enabling communication of data over a network.

SUMMARY

According to one embodiment of the present invention, a system for operating memory includes a first node coupled to a second node by a network, the system configured to perform a method including receiving the remote transaction message from the second node in a processing element in the first node via the network, wherein the remote transaction message bypasses a main processor in the first node as it is transmitted to the processing element. In addition, the method includes accessing, by the processing element, data from a location in a memory in the first node based on the remote transaction message, and performing, by the processing element, computations based on the data and the remote transaction message.

According to another embodiment of the present invention, a network system includes a first node coupled to a second node by a network, the system configured to perform a method including receiving the remote transaction message from the second node in a processing element in the first node via the network, wherein the remote transaction message bypasses a main processor in the first node as it is transmitted to the processing element. The method further includes accessing, by the processing element, a location in a memory in the first node based on the remote transaction message; and performing, by the processing element, computations on data based on the remote transaction message, the data comprising at least one of: data from the location in the memory and data from within the remote transaction message.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments include a plurality of networked computing nodes, where remote nodes include one or more processing elements, separate from the main processor, located within or closely coupled to a memory system. The arrangement provides remote processing by pushing execution of instructions and associated computations to the memory where the data being manipulated resides. This is in contrast to systems that pull data from memory and compute on a main processor. Accordingly, a system is provided in which selected messages, called remote transaction messages, flow across the network and can initiate procedures or instructions that run in the remote node's memory system without involvement by a main processor in the node. Optionally, following execution of the message, a return value of the procedure or a completion signal is transmitted back to the sending node or to nodes in the system, including the source node or other nodes. In one embodiment, a second remote transaction message is sent by the remote node to the source node and/or other nodes following execution of the first message. An embodiment leverages the tight integration between the interconnection network and non-traditional asynchronous processing elements, particularly processing elements that are embedded within the memory system. This approach co-exists with and uses traditional direct memory access (DMA) and network hardware.

Embodiments provide the benefit of main processor offloading and reduction in software communication pathlength, preventing processor cache pollution while cache injecting only the most relevant data, reducing latency and saving energy by moving computation remotely to the memory system where the data resides. In one embodiment, the network and its associated DMA unit are integrated onto the same die as the main processor, leveraging the low latency, high bandwidth connectivity to processing elements in memory provided by a local interconnect network.

Embodiments of a node with a memory device including a processing element, memory controller and memory (e.g. a stack of memory) may be referred to as an active buffered memory device. Another embodiment builds upon atomic memory operations that provide single instruction atomic operations including but not limited to increment, fetch-and-add, min/max, bitwise operations, and push and pop operations onto/off queues, such as shared workload double-ended queues, at memory system bandwidths.

As compared to other embodiments, the arrangement provides reduced data movement over local networks between a main processor and memory, and a bypass of slow software paths on the processor, thus improving performance and reducing latency. The large amounts of data transmitted across the local network between the processor and memory utilizes a significant amount of both bandwidth and power, and consumes processor cycles to process the data. Specifically, a main processor may request a read of data at a location in the local memory system, where the data is transmitted, via the local network, from the memory system to the main processor. The main processor then performs an arithmetic or logic operation on the data and the resulting data is sent back across the local network to be stored at the location in the local memory system. The transmission of the data across the local network causes increased bandwidth and power usage as compared to the remote transaction message system discussed herein. A "local network" may refer to data paths local to a given node between its processor, processing element(s) and memory. In embodiments, the local network may include an interconnect network as part of the local data path. The term "network" or "node network" may refer to the network which connects the nodes together.

Computing systems utilizing remote transaction messages may leverage a tight integration between the network interface within each node and a processing element also located on the node. Accordingly, the arrangement provides an efficient path for the remote memory transaction to travel through the node's network interface across the local interconnect network and directly into the processing element. The local interconnect network is a high bandwidth interconnect within a node to provide data movement between the network interface, processor, processing elements and memory devices. In an embodiment, the local interconnect network is a coupling device, such as a crossbar switch, configured to connect any processing element to any memory vault (i.e. stack of memory devices) in a memory system, provided the processing element and memory vault are coupled to the local interconnect network.

In one embodiment, the processing elements are programmable engines, comprising an instruction buffer, an instruction unit, including branching capability and instruction decode, a mixture of vector, scalar, and mask register files, a plurality of load/store units for the movement of data between memory and the register files, and a plurality of execution units for the arithmetic and logical processing of various data types. Embodiments of the processing element in the memory system also have the ability to read or to write operands in any part of the local memory through the local interconnect network. Specifically, a processing element may access multiple memory devices using a local interconnect network. In embodiments, the processing elements are located in any suitable memory, such as cache, random access memory or other memory types, or in logic tightly coupled to the memory, such as a memory controller or direct memory access (DMA) device.

Figure 1:
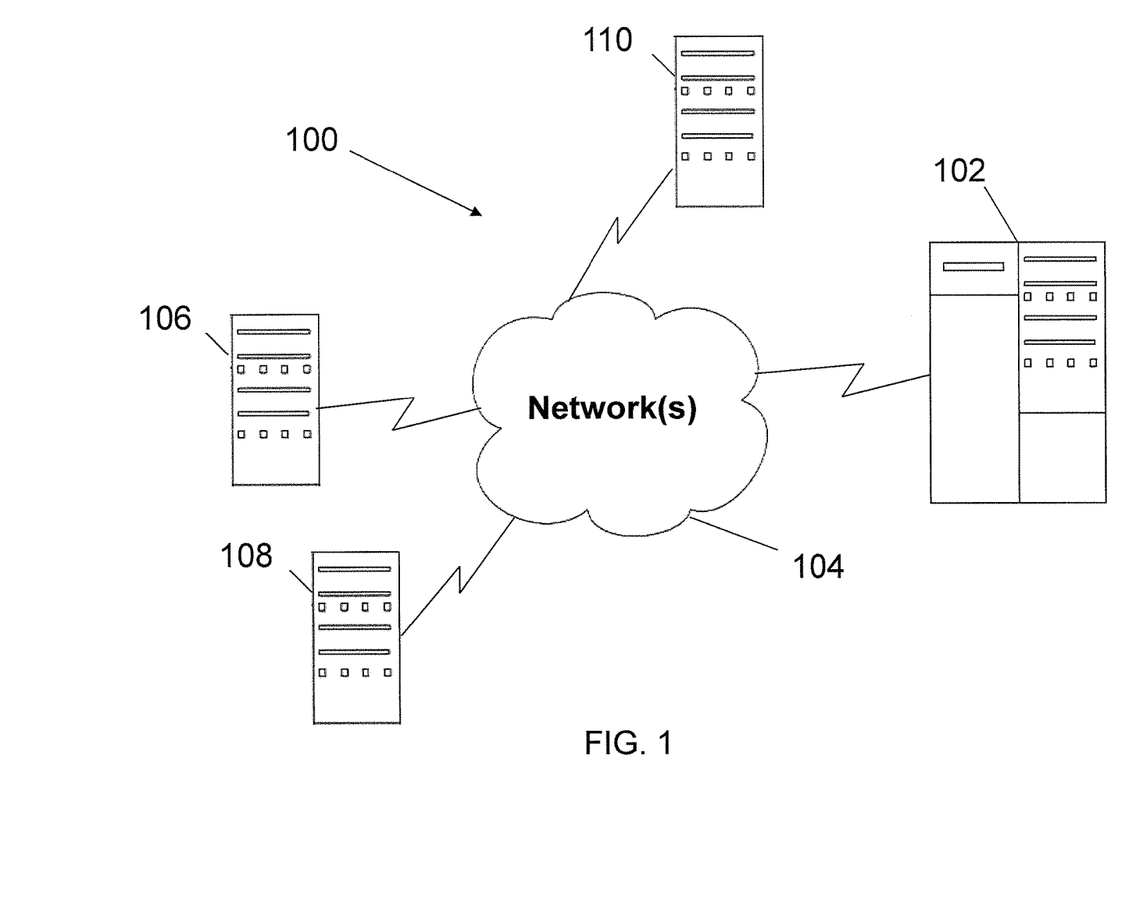
FIG. 1 illustrates a block diagram of a networked computing system using remote transaction messages in accordance with an embodiment.

With reference now to FIG. 1, a diagram of a networked computing system 100 is shown according to an embodiment. The networked computing system 100 includes a source computer 102, also referred to as source node, coupled to other nodes, also referred to as remote nodes, via network(s) 104. As depicted, the network 104 is coupled to the source computer 102, remote node computer 106, remote node computer 108 and remote node computer 110. In embodiments, any of the nodes 102, 106, 108 and 110 may operate as the source node or source computer, where the source computer provides a remote transaction message to one or more receiving remote nodes, thereby providing one or more instructions to be performed remotely by processing elements located within memory devices of the remote nodes. The term remote may be used to describe a computing node or memory with a processing element that is coupled to a node network including the source node and, thus, receives a message from the source computer through the node network, where remote processing of instructions and data offloads instructions from a main processor and reduces latency for performing the remote instructions.

The node network(s) 104 may be any type of known networks including, but not limited to, a wide area network (WAN), a local area network (LAN), a global network (e.g. Internet), a virtual private network (VPN), and an intranet. Embodiments of the system may be implemented on a network of any topology, including but not limited to, a torus, fat tree, or all-connect. The network 104 may be implemented using a wireless network (e.g., cellular, satellite, etc.) or any kind of physical network implementation known in the art. The source computer 102 and remote node computers 106, 108 and 110 may be coupled through multiple networks (e.g., intranet and Internet) so that not all node computers 106, 108 and 110 are coupled to the source computer 102 through the same network. One or more of the node computers 106, 108, 110 and source computer 102 may be connected to the network 104 in a wireless fashion. In one embodiment, one or more of the node computers 106, 108, 110 is connected directly (i.e., not through the network 104) to the source computer 102.

Figure 2:
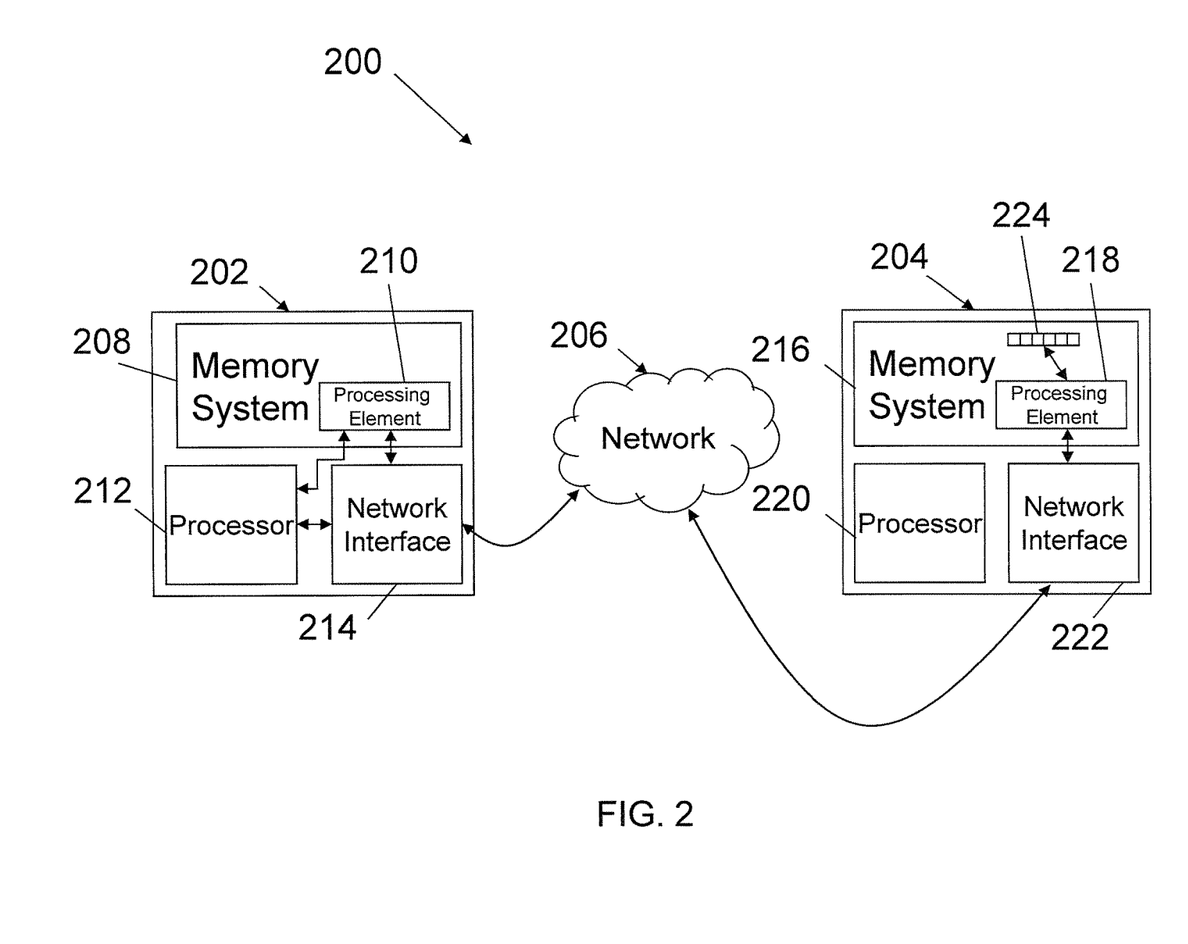
FIG. 2 illustrates a schematic diagram of a networked computing system using remote transaction messages in accordance with an embodiment.

FIG. 2 is a diagram of an exemplary system 200 for remote processing and memory utilization. The computing system includes a first node 202 and a second node 204 coupled by a network 206. The first node 202 includes a memory device or system 208 with a processing element 210. The first node 202 also includes a main processor 212 and network interface 214. Similarly, the second node 204 includes a memory system 216 with a processing element 218, a main processor 220 and a network interface 222. In an embodiment, the main processor 212 or processing element 210 transmits or injects a remote transaction message to the network interface 214, where the message is transmitted to the network interface 222 via the network 206. The message may be one of a plurality of messages in a queue in the first node 202. The remote transaction message bypasses the main processor 220 and is transmitted to the processing element 218, where the processing element accesses the memory system 216 to access data 224 at a selected location in memory.

In an embodiment, the processing element 218 receives the message and translates a virtual address in the message to a real address using configuration information loaded from the memory system 216, where the real address is a location of the data 224 to be manipulated. In another embodiment, the message includes the real address of the data 224. The message may also have the processing element 218 perform a complex mathematical or logic instruction on the data 224 after it is read. Further, the data 224 may also be stored back to the memory system 216 after the instruction(s) are executed. In another embodiment, the processing element 218 receives at least a portion of the data within the message and stores the data 224 in the memory system 216. In an embodiment, the processing element 218 may perform an instruction loaded from the memory system 216 on the data 224 before storing it. After the processing element 218 has performed the instruction(s), a return value or signal is sent to the first node 202 indicating the remote transaction message, including the instructions contained therein and/or indicated by pointers in the message, has been executed. The completion value or signal transmitted to the first node 202 may depend on at least one result of the instruction or procedure specified by the memory transaction message. In an embodiment, a second remote transaction message is sent from the first node 202 to the second node 204 and/or other nodes based on receiving the return value or signal following execution of the first message. The second remote transaction message may also include instructions for remote processing and memory access by the processing element 218 without interaction with the main processor 220. In a "chained" node arrangement, a second remote transaction message is sent from the second node 204 to a third node based on receiving a selected return value result.

Figure 3:
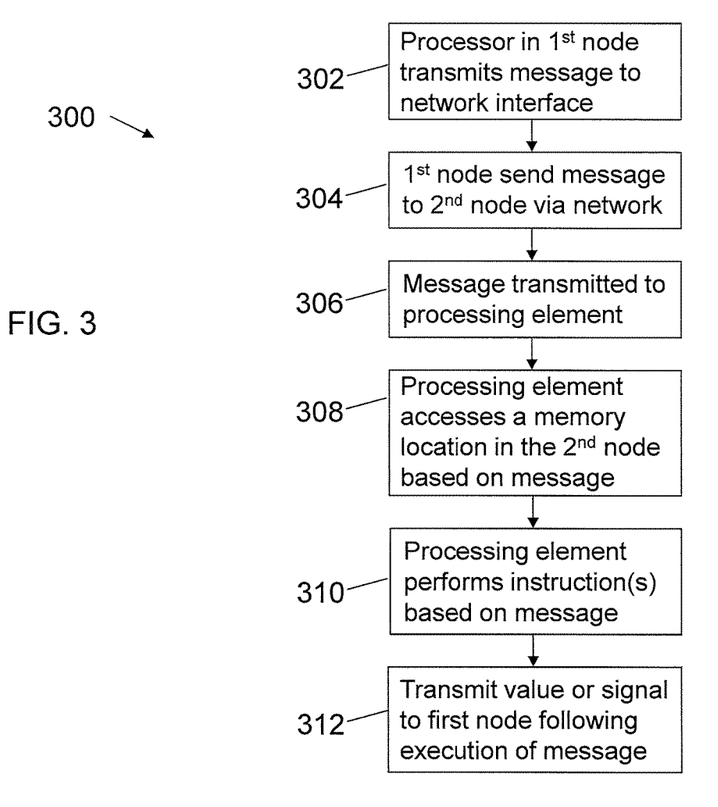
FIG. 3 illustrates a flow diagram of a method for operating a computer system with remote transaction messages in accordance with an embodiment.

FIG. 3 is a flow chart of an exemplary process 300 for operating a computer system using remote transaction messages using computing systems, such as those in FIGS. 1-2. The depicted blocks may be part of, or in addition to, another process and/or may be performed in any suitable order to provide remote transaction messages to access memory. In block 302, a main processor in a first node transmits a remote transaction message to a network interface in the first node. In some embodiments, a processing element in the first node sends the message to the network to initiate the remote transaction transmission instead of the main processor. Further, one or more remote transactions may be transmitted from the first node to several nodes connected via the network, thus freeing up a main processor in the first node to perform other operations. In an embodiment, the first node sends transaction messages to two or more nodes, where a result used by the first node (e.g., for a computation) is based on at least one result from execution of the transaction messages. In addition, the other nodes may further distribute remote transaction message(s), based on the message from the first node, to other available remote nodes with processing elements to balance loads across nodes on the network.

In block 304, the remote transaction message is sent from the network interface in the first node through the network to the second node, where the message is received by a network interface. In block 306, the message is transmitted directly to a processing element in the second node, bypassing a main processor in the second node. In block 308, based on the remote transaction message, the processing element in the second node accesses data at a memory location in the second node. In embodiments, the remote transaction message may utilize data included in the message as well as data from memory in the second node. In an embodiment, the remote transaction message may include one or more instructions or pointers to instruction that may be loaded from within the memory in the second node. The instruction (s) may include loading data from and/or storing data to selected locations in memory. Further, instruction(s) may also include complex operations, such as arithmetic or logic instructions. Accordingly, in block 310, the processing element in the second node performs the instruction(s) based on the received remote transaction message. In block 312, a return value or signal is transmitted by the processing element in the second node to the first node. Further, the first node may send a second remote transaction message to the second node, similar to blocks 302 to 308 based on receiving the return value. In an embodiment, the second node transmits a return value to the first node and to additional nodes via the network to identify that the message has been executed. In one embodiment, the processing element in the second node sends a return value based on one of: the completion of the remote transaction message received by the second node or the completion of a remote transaction message received by another networked node. For example, a source node may send two or more remote transaction messages that are substantially identical to two or more networked nodes, where the node that completes execution of the message first sends a return value to each of the nodes to indicate message completion. In another example, a source node may send two or more remote transaction messages that are different to two or more networked nodes. In embodiments, the two or more remote transaction messages are sent substantially simultaneously to a plurality of nodes.

In an embodiment, the remote transaction message system extends across the network, to an entire machine and, upon message receipt, enables an instruction or instruction sequence to be directly executed in the memory system of the receiving second node. An instruction may be encoded within the message, or a message may contain a function pointer to an instruction stored in the receiving node. Such an instruction could consist of the following operations: control-flow, arithmetic, bit-manipulation, memory accesses, concurrent data structure manipulation, issuing of other remote transactions to networked nodes.

In embodiments, the remote transaction message may push a data structure across the network onto a queue, such as a double ended queue, on a remote node, returning a success or fail (e.g. if the queue is full) as a return value to the source node. The queue may represent a shared workload queue over the entire machine. In addition, the message may send a network request to pop a data structure from a double ended queue on a receiving node, where a null structure is the return value to the source node if the double ended queue is empty. In an embodiment, the popped element is either sent back to the source node or forwarded on to a third node. In another embodiment, the remote transaction message initiates a floating-point intensive procedure on the receiving node. For example, an application on a first node sends block-strided messages containing double-precision data that need to be added to data on the receiving second node. The necessary data read, add and write can be done directly in the second node's memory, using in-memory scatter/gather capability, without pulling entire lines into the caches of the main processor in the second node. In one embodiment, the sending node could also use scatter-gather capability in the node memory/processing element to gather the data into a message and then inject that transaction message to the remote node. The receiving node's scatter-gather capability processes the message and adds the message payload data with the local memory data, then scatters the data back to memory.

In an example, the remote transaction message system may be configured to write data from the message into the memory system on a receiving node and push a completion notice onto a queue for the main processor when done. In another example, the remote transaction message system may be configured to atomically test the value at an address on a receiving node, conditionally store data into the node's memory depending on the outcome of the test, and return the result of the test to the sending or source node. This is a simple form of an "if-then-else" transaction, but more sophisticated controlling transactions may be utilized in embodiments.

In an embodiment, the remote transaction message may initiate a data intensive procedure in a receiving node's memory, such as following a linked list until a key value is found, and returning the key and its associated data structure. Alternatively, data from the message can be inserted onto the linked list. In a message containing multiple atomic memory updates targeting different memory devices in different nodes, the remote transaction message may route the updates to the proper memory device where the atomic memory operations are applied.

In an embodiment, the remote transaction message may be an atomic transaction message. The atomic transaction message may perform actions in memory and computations based on successful execution or occurrence of one or more selected events, where if the selected event does not occur, the memory and node return to a selected state that existed prior to receiving the message. The selected event thus triggers the execution of the transaction message, whereby successful execution causes the results to be committed to memory, and where the selected event may be execution of a computation or instruction on one or more remote nodes. Further, as part of the atomic transaction message, the memory locations accessed during a failed or successful message execution may not be accessed by other instructions.

In one embodiment, there may be hardware support for message passing interface ("MPI") tag matching. For example, a processor posts an MPI receive with a specified tag (ID). A remote transaction may arrive with a corresponding MPI tag and it can be determined whether the arrived tag matches any of the processor's posted receive tags without intervention by the processor. The result of the remote transaction can be to notify the receiving node's processor, or to perform any of the other functions or combination of functions normally performed as the result of a remote memory transaction.

In one embodiment, a processing element may be sufficient to support data intensive remote memory transactions. In embodiments, the processing element may access, possibly across a network, slower types of memory such as non-volatile memory where long latencies quickly exhaust the limited outstanding load queues of most processors.

In one embodiment, if a receiving node does not contain the desired data, it can forward the remote memory transaction on to another remote receiving node which does. For example, a node with RAM receives a transaction but it is determined that the node no longer stores the data at the specified address(es). So the node forwards the transaction on to another remote node with attached storage at a lower level of the memory hierarchy, e.g. hard disk, where the data does reside. The second remote node processes the transaction and returns the result to the original node as if the first remote node had processed the transaction.

In addition, remote transaction messages can be directed to the appropriate level of the memory hierarchy on the receiving node, providing cache injection for latency sensitive messages and preventing cache pollution on longer messages. In an embodiment, messages might contain software controllable hints as to where in the memory hierarchy payload data is to be placed.

For example, if it is known that received message data will be used in a processing element that is tightly coupled with a particular memory device, the received data should be put into that memory device, allowing the processing element to access the data efficiently. Another advantage in this case is that the data does not occupy the caches used by the processor, hence avoiding cache pollution (i.e., frequently-used important data is evicted from the cache, degrading the processor's performance). On the other hand, if the received message data needs pre-processing by the DMA engine within the network interface (e.g., judging in which processing element to process data), the received data should be put into cache (i.e., cache injection) or some other storage element close to and accessible from the network interface, allowing it to access the data efficiently. The result data of remote memory transaction can also be directed to the appropriate level of the memory hierarchy in a similar way.

Technical benefits include improved computing system performance by reducing a burden on a main processor as well as reduced data transfer power and bandwidth consumed during transactions by providing messages to remote computing nodes to process instructions remotely.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:
1. A method for reducing network data traffic when operating a memory system of a machine comprising:

a first node coupled to a second node by a network, the first node comprising: a first main processor, a first network interface, a first active buffered memory device including a first processing element and a first memory vault comprising a first stack of memory devices, and a first local interconnect network providing a first data movement path between the first network interface, the first main processor, the first processing element, and the first stack of memory devices, wherein the first processing element and the first memory vault are coupled to the first local interconnect network within the first node, and the second node comprising: a second main processor, a second network interface, a second active buffered memory device including a second processing element and a second memory vault comprising a second stack of memory devices, and a second local interconnect network providing a second data movement path between the second network interface, the second main processor, the second processing element, and the second stack of memory devices, wherein the second processing element and the second memory vault are coupled to the second local interconnect network within the second node, the method comprising:

receiving a processing instruction at the second node;

determining, by the second node, that the processing instruction includes an operation utilizing data stored locally at the first node, wherein said data was already stored in the first stack of memory devices at the first node prior to receipt of the processing instruction at the second node;

transmitting a remote transaction message from the second node to the first node across the second local interconnect network through the second network interface across the network to the first network interface, the remote transaction message identifying the operation and the data already stored locally at the first node to be utilized in the operation to push execution of the operation from the second node to the first processing element of the first node;

receiving the remote transaction message from the second node in the first processing element in the first node via the first network interface and the first local interconnect network while bypassing the first main processor on the first node;

accessing, by the first processing element in the first node, the data to be utilized in the operation identified in the remote transaction message from a location in the first stack of memory devices in the first node;

performing, by the first processing element in the first node, the operation identified in the remote transaction message utilizing the locally stored data identified in the remote transaction message to obtain an operation result;

updating, by the first processing element in the first node, the locally stored data in the first stack of memory devices based on the operation result; and transmitting the operation result from the first node to the second node in response to performing the operation identified in the remote transaction message.

2. The method of claim 1, wherein receiving the remote transaction message comprises receiving a remote transaction message that includes at least one of a selected instruction or a pointer to the selected instruction in the first stack of memory devices in the first node, the selected instruction using data from the first stack of memory devices or from the remote transaction message.

3. The method of claim 1, comprising receiving the return value at the second node and sending a second remote transaction message to the first node based on receiving the return value or signal following execution of the remote transaction message.

4. The method of claim 1, wherein receiving the remote transaction message comprises receiving from the second main processor or the second processing element in the second node from the second network interface in the second node at the first processing element via the first network interface in the first node.

5. The method of claim 1, wherein receiving the remote transaction message comprises receiving, substantially simultaneously, a plurality of remote transaction messages from the second node at a plurality of nodes including the first node, via the network.

6. The method of claim 1, wherein receiving the remote transaction message comprises receiving a remote transaction message comprising an atomic transaction.

7. The method of claim 1, wherein receiving the remote transaction message comprises receiving, from the second node, a first transaction message and a second transaction message to the first node and a third node, respectively, via the network, wherein a result used in the second node is based on at least one result from execution of the first transaction message and the second transaction message.

8. The method of claim 1, wherein accessing, by the first processing element, the location in the first stack of memory devices in the first node based on the remote transaction message comprises translating, by the first processing element, a virtual address to a real address and accessing the data at the location in the first stack of memory devices using the real address.

9. The method of claim 1, further comprising:

posting, by the first main processor, a message passing interface receive indicator with a tag identifier;

receiving the remote transaction message from the second node with a tag corresponding to the tag identifier;

determining by the first network interface of the first node whether the tag received with the remote transaction message matches the tag identifier absent intervention by the first main processor; and notifying the first main processor of the operation result responsive to matching the tag identifier by the first network interface and performing the operation by the first processing element.

10. A method for reducing network data traffic when operating a system of a machine comprising:

a first node coupled to a second node by a network, the first node comprising: a first main processor, a first network interface, a first active buffered memory device including a first processing element and a first memory vault comprising a first stack of memory devices, and a first local interconnect network providing a first data movement path between the first network interface, the first main processor, the first processing element, and the first stack of memory devices, wherein the first processing element and the first memory vault are coupled to the first local interconnect network within the first node, and the second node comprising: a second main processor, a second network interface, a second active buffered memory device including a second processing element and a second memory vault comprising a second stack of memory devices, and a second local interconnect network providing a second data movement path between the second network interface, the second main processor, the second processing element, and the second stack of memory devices, wherein the second processing element and the second memory vault are coupled to the second local interconnect network within the second node, the method comprising:

receiving a processing instruction at the second node;

determining, by the second node, that the processing instruction includes an operation utilizing data stored locally in the second stack of memory devices at the second node and data stored locally in the first stack of memory devices at the first node, wherein said data was already stored at the first and second nodes prior to receipt of the processing instruction at the second node;

transmitting a remote transaction message from the second node to the first node across the second local interconnect network through the second network interface across the network to the first network interface, the remote transaction message including the data already stored locally at the second node to be utilized in the operation and identifying the operation and the data already stored locally at the first node to be utilized in the operation to push execution of the operation from the second node to the first processing element of the first node;

receiving the remote transaction message from the second node in the first processing element in the first node via the first network interface and the first local interconnect network while bypassing the first main processor on the first node;

accessing, by the first processing element in the first node, a location in the first stack of memory devices in the first node based on the remote transaction message;

performing, by the first processing element in the first node, the operation identified in the remote transaction message utilizing the data included in the remote transaction message and the locally stored data identified in the remote transaction message to obtain an operation result;

updating, by the first processing element in the first node, the locally stored data in the first stack of memory devices based on the operation result; and transmitting the operation result from the first node to the second node in response to performing the operation identified in the remote transaction message.

11. The method of claim 10, wherein receiving the remote transaction message comprises receiving a remote transaction message that includes at least one of a selected instruction or a pointer to the selected instruction in the first stack of memory devices in the first node, the selected instruction using data from the first stack of memory devices or from the remote transaction message.

12. The method of claim 10, comprising receiving a second remote transaction message at the first node from the second node based on receiving the return value or signal at the second node following execution of the remote transaction message.

13. The method of claim 10, wherein receiving the remote transaction message comprises receiving the remote transaction message from the second main processor or the second processing element in the second node from the second network interface in the second node at the first processing element via the first network interface in the first node.

14. The method of claim 10, wherein receiving the remote transaction message comprises receiving, substantially simultaneously, a plurality of remote transaction messages from the second node at a plurality of nodes, including the first node, via the network.

15. The method of claim 10, wherein receiving the remote transaction message comprises receiving a remote transaction message comprising an atomic transaction.

16. The method of claim 10, wherein receiving the remote transaction message comprises receiving, from the second node, a first transaction message and a second transaction message to the first node and a third node, respectively, via the network, wherein a result used in the second node is based on at least one result from execution of the first transaction message and the second transaction message.

17. The method of claim 10, wherein accessing, by the first processing element, the location in the first stack of memory devices in the first node based on the remote transaction message comprises translating, by the first processing element, a virtual address to a real address and accessing the data at the location in the first stack of memory devices using the real address.

18. The method of claim 10, further comprising:

posting, by the first main processor, a message passing interface receive indicator with a tag identifier;

receiving the remote transaction message from the second node with a tag corresponding to the tag identifier;

determining by the first network interface of the first node whether the tag received with the remote transaction message matches the tag identifier absent intervention by the first main processor; and notifying the first main processor of the operation result responsive to matching the tag identifier by the first network interface and performing the operation by the first processing element.

* * * * *